US012785897B2

(12) United States Patent
Janjua et al.

(10) Patent No.: US 12,785,897 B2

(45) Date of Patent: Nov. 3, 2026

(54) SECURE PILOT ALLOCATION FOR INTEGRATED SENSING AND COMMUNICATION

(71) Applicant: ISTANBUL MEDIPOL UNIVERSITESI, Istanbul (TR)

(72) Inventors: Muhammad Bilal Janjua, Istanbul (TR); Ebubekir Memişoğlu, Istanbul (TR); Hüseyin Arslan, Istanbul (TR)

( * ) Notice: Subject to any disclaimer, the term of this patent is extended or adjusted under 35 U.S.C. 154(b) by 78 days.

(21) Appl. No.: 18/719,664

(22) PCT Filed: Dec. 7, 2022

(86) PCT No.: PCT/TR2022/051446
§ 371 (c)(1),
(2) Date: Jun. 13, 2024

(87) PCT Pub. No.: WO2023/113735
PCT Pub. Date: Jun. 22, 2023

(65) Prior Publication Data

US 2025/0055633 A1 Feb. 13, 2025

(51) Int. Cl.
*H04L 5/00* (2006.01)
*H04W 12/128* (2021.01)
*H04W 52/22* (2009.01)

(52) U.S. Cl.
CPC ............ *H04L 5/0051* (2013.01); *H04L 5/008* (2013.01); *H04W 12/128* (2021.01); *H04W 52/225* (2013.01)

(58) Field of Classification Search
CPC ..... H04L 5/0051; H04L 5/008; H04L 5/0057; H04L 5/0058; H04L 5/0048; H04W 12/128; H04W 52/225
See application file for complete search history.

(56) References Cited

U.S. PATENT DOCUMENTS

| | | | | |
|---|---|---|---|---|
| 8,300,533 | B2 * | 10/2012 | Malladi | H04L 5/0048 370/235 |
| 9,504,004 | B1 * | 11/2016 | Auvenshine | H04W 68/005 |
| 10,903,951 | B2 * | 1/2021 | Krzymien | H04L 5/0048 |
| 2012/0088515 | A1 * | 4/2012 | Choi | H04L 5/0051 455/450 |
| 2021/0344439 | A1 * | 11/2021 | Kuchi | H04L 5/006 |
| 2022/0408220 | A1 * | 12/2022 | Edge | H04L 5/0048 |

FOREIGN PATENT DOCUMENTS

| | | | | |
|---|---|---|---|---|
| EP | 3197087 | A1 | 7/2017 | |
| WO | WO-2017144112 | A1 * | 8/2017 | H04L 5/0048 |

OTHER PUBLICATIONS

International Search Report for corresponding PCT/TR2022/051446 dated Jun. 13, 2023.
Written Opinion of the International Searching Authority for corresponding PCT/TR2022/051446 dated Jun. 13, 2023.
(Continued)

*Primary Examiner* — Richard G Keehn
(74) *Attorney, Agent, or Firm* — Egbert, McDaniel & Swartz, PLLC

(57) ABSTRACT

Disclosed is a method for allocation of the secure pilots for integrated sensing and communication against potential security threats.

4 Claims, 4 Drawing Sheets

(56) References Cited

OTHER PUBLICATIONS

An, Jiancheng, et al. The Optimal Pilot Power Allocation Strategy for Multi-IRS Assisted Communication Systems. arXiv preprint arXiv:2110.11534, Oct. 2021.
Xiong, Qi, et al. An energy-ratio-based approach for detecting pilot spoofing attack in multiple-antenna systems. IEEE Transactions on Information Forensics and Security, 2015, 10.5: 932-940. [Abstract Provided, See Written Opinion—General State of the Art].

* cited by examiner

SECURE PILOT ALLOCATION FOR INTEGRATED SENSING AND COMMUNICATION

TECHNICAL FIELD

This invention relates to a method for allocation of the secure pilots for integrated sensing and communication against potential security threats.

PRIOR ART

In integrated sensing and communication, most of the sensing parameters are extracted from the channel state information (CSI). To make the CSI available for communication and sensing, known pilot symbols with known locations in the time-frequency plane are transmitted. However, if the malicious node knows the pilot location, it can either extract the sensing information or contaminate the pilots to disrupt the communication. To secure sensing and communication, the location of pilots must be secured in a way that can be only identified by the legitimate user.

At present, there are only a few approaches based on pilot manipulation to provide physical layer security. The work by Wei, H., et al, published in 2013 at 22$^{nd}$ Wireless and Optical Communication Conference proposes a mechanism for the random pilot allocation based on codebook to hide the pilots' locations from the malicious node. Initially, the random pilot codebook is generated from the measurement matrix of the compressive channel sensing (i.e., partial Fourier transform matrix). Additionally, the authors propose an instantaneous CSI-based key generation mechanism to encrypt the random pilot codebook. In a publication by Soltani, M., et al, published in 2015 the pilot symbols manipulation approach based on the CSI shared between the legitimate nodes is proposed to provide secure communication. Two approaches are followed for the pilot manipulation; phase-based and amplitude-based. In the phase-based approach, the phase of the instantaneous channel is compared with a selected threshold to manipulate the pilot symbols. On the other hand, the estimated amplitude of the channel is compared with the selected threshold for pilot manipulation.

The approach proposed in the work by Wei, H., et al, mentioned above requires, the random pilot codebook generation at the beginning for pilot allocation, which needs to be shared between both legitimate nodes. Besides, the random pilot codebook has a limited number of patterns that can be estimated through extensive simulations.

However, in the pilot symbol manipulation approach given in Soltani, M., et al, the illegitimate node can detect the pilots through correlation as the locations of the pilots are known to everyone. The current state of the art shows that there is a need for new methods for providing secure transmission for joint sensing and communication applications.

Aim of the Invention

For wireless communication, the signal in the environment can be utilized to detect the data and sensing information. For instance, the transmitted data can be decoded by an eavesdropper if not encrypted. Even encrypted, it can decode the data with high computational processing capabilities if some of the signal information is known e.g., pilots. Moreover, the signal in the environment can be used to detect range, velocity, angle of transmitter and receiver as sensing information.

Therefore, the purpose of the invention is to provide security for data and sensing information jointly by hiding the pilot subcarriers' locations at the transmitter based on the channel state information between the transmitter and receiver.

BRIEF DESCRIPTION OF THE INVENTION

Present invention relates to a method for protecting integrated sensing and communication against potential security threats wherein said method comprises the steps of;

- Allocation of the adaptive pilot based on the channel state information of the user whose communication is to be secured,
- Allocation of the adaptive power to reduce the pilot location identification error by increasing the gap between the signal power at the transmitter and the receiver of the aforementioned user, and
- Identification of the pilot location from the average power of the received signal at the user.

In this invention, instead of generating a random pilot codebook or manipulation of pilot symbols as described in the prior art, we propose a method to secure pilot location with adaptive pilot allocation based on the instantaneous channel between the legitimate nodes to provide security. Through the method of the invention, only the legitimate nodes can identify the location of the pilots to perform sensing and communication. Furthermore, an adaptive power allocation mechanism is proposed to reduce the pilot location identification error rate at the receiving node. In another aspect, the invention provides secure transmission for joint sensing and communication information without a common knowledge between transmitter and receiver.

The main advantage of the invention is to provide secure transmission of pilots for integrated sensing and communication. For this purpose, the pilots are manipulated at the transmitter based on the channel state information between the transmitter and receiver. Different from the channel, the receiver does not know the pilot locations and the channel state information. At the receiver, firstly, the invention detects the pilot locations from the averaged signal power of the received signal. After the pilot subcarrier location is detected, the channel is estimated from the detected pilot subcarriers. Since the different links have different fading characteristics, the pilot subcarrier locations can not be detected.

110: a legitimate transmitter
120: a legitimate receiver
130: eavesdropper
140A: Wireless link from 120 to 110
140B: Wireless link from 120 to 130
150A: Wireless link from 110 to 120
150B: Wireless link from 110 to 130

Figure 2:
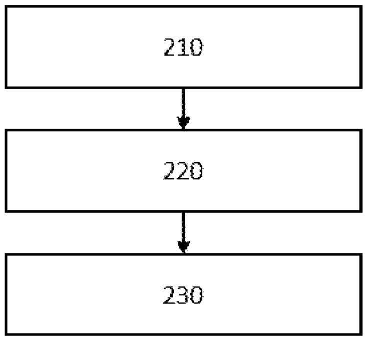

FIG. 2: the flow diagram of the basic operations for secure integrated sensing and communication in accordance with certain aspects of the present invention

210: Apply adaptive pilot allocation mechanism at 110 to allocate the pilots based on channel state information received from 120.

220: Apply adaptive power allocation mechanism at 110 to reduce the pilot location identification error at 120.

230: Apply pilot location identification mechanism at 120 to detect the locations of pilots.

Figure 3:
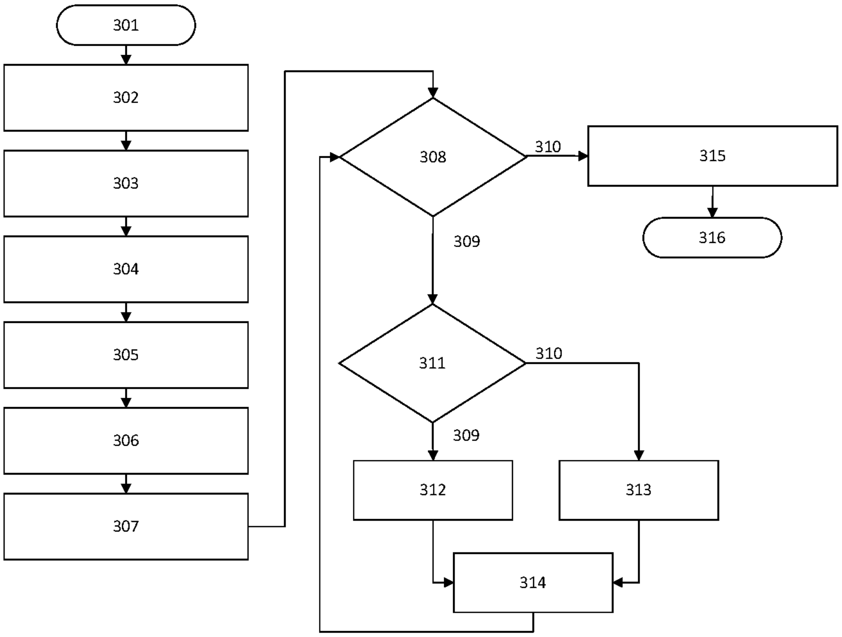

FIG. 3: flow chart illustrating the adaptive pilot allocation mechanism that is applied at 110 for securing pilots' locations for pilot allocation.

301: start of the flow chart.

302: initialization of parameters including $N_{PC}$, $S_T$ $N_{SC}$, $N_{TS}$, $N_{SG}$, $N_{TP}$, $L_{PG}$. $N_{PC}$ represents channel bandwidth, $N_{SC}$ represents the number of subchannels, $N_{TS}$ represents the total subcarriers in the transmit signal at 110, $S_T$ represents a total number of subgroups, $N_{SG}$ denotes the total subcarriers in a subgroup, $N_{TP}$ denotes the possible positions for the pilot subcarriers in a subgroup, and $L_{PG}$ denotes the location of pilot subcarrier within $N_{TP}$.

303: Defines the threshold value $T_H$ based on the average power of the channel

304: divide $N_{PC}$ into $N_{SC}$ subchannels

305: interleave subchannels to reduce the correlation between the neighboring subchannels so 130 may not estimate the channel through correlation.

306: Divide $N_{TS}$ into subgroups each having $N_{SG}$ subcarriers and multiplying with the power of the corresponding subchannel.

307: Calculate average power of each subgroup $P_{SG}$.

308: check if $i<=S_T$? is true 309 (i.e., pilots locations are not decided in all subgroups), go to step 311. Otherwise, if the statement is false 310 (i.e., pilot locations have been decided in all subgroups), go to step 315, where i denotes the ith subgroup of subcarriers in the transmit signal at110

309: True

310: False

311: compare $P_{SG}$ with $T_H$, if $P_{SG}(i)<T_H$? is true 309 (i.e., $P_{SG}$ of ith subgroup is less than $T_H$), go to step 312. Otherwise, if $P_{SG}(i)<T_H$? is false 310 (i.e., $P_{SG}$ of ith subgroup is greater than $T_H$), go to step 313.

312: allocate the subcarrier on the position α in subgroup to pilot symbol (i.e., $L_{PG}(i)=\alpha$)

313: allocate the subcarrier on the position b in subgroup to pilot symbol (i.e., $L_{PG}(i)=b$)

314: i=i+1, increment in i by 1 (i.e., count the subgroup for which the pilot location has been decided) and go to step 308 i: The variable to count the iteration for a loop

315: place pilot and data symbols on the pilot and data subcarriers, respectively

316: End the flow chart

Figure 4:
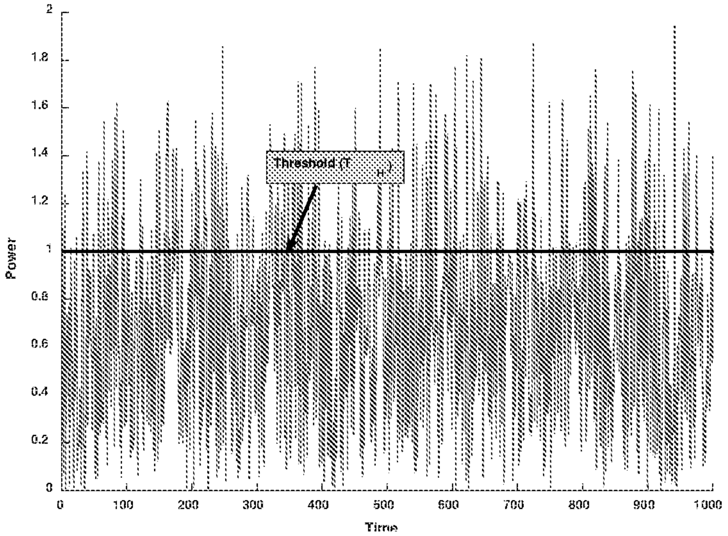

FIG. 4: a plot illustrating the signal generated at the transmitter.

Figure 5:
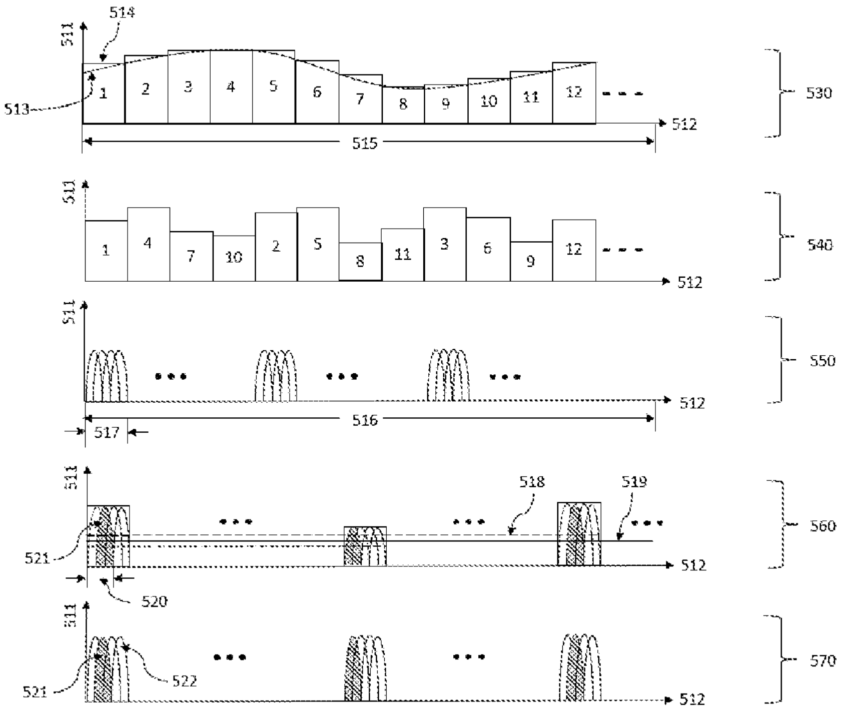

FIG. 5: Pictorial representation of the adaptive power algorithm at 110

511: Power

512: Frequency

513: Channel frequency response

514: Subchannels

515: channel bandwidth

516: total number of subcarriers

517: number of subcarriers in a subgroup

518: average power of a subgroup

519: threshold value $T_H$

520: possible pilotlocations

521: pilot subcarrier carrying pilot symbol

522: data subcarriers carrying data symbols

530: channel frequency response 513 with channel bandwidth 515

540: channel interleaving phenomenon to reduce the correlation between neighboring subchannels

550: subgroups of the subcarriers in transmit signal

560: subcarriers in a subgroup after multiplication with the channel

570: $N_{TS}$ with pilot symbols 521 and data symbols 522 in each subgroup FIG. 6: a plot illustrating the adaptive power allocation mechanism which is disclosed in the invention to maintain a power gap $P_G$ between $T_H$ and the power of the transmit signal at 110 and power of the receive signal at 120.

Figure 7:
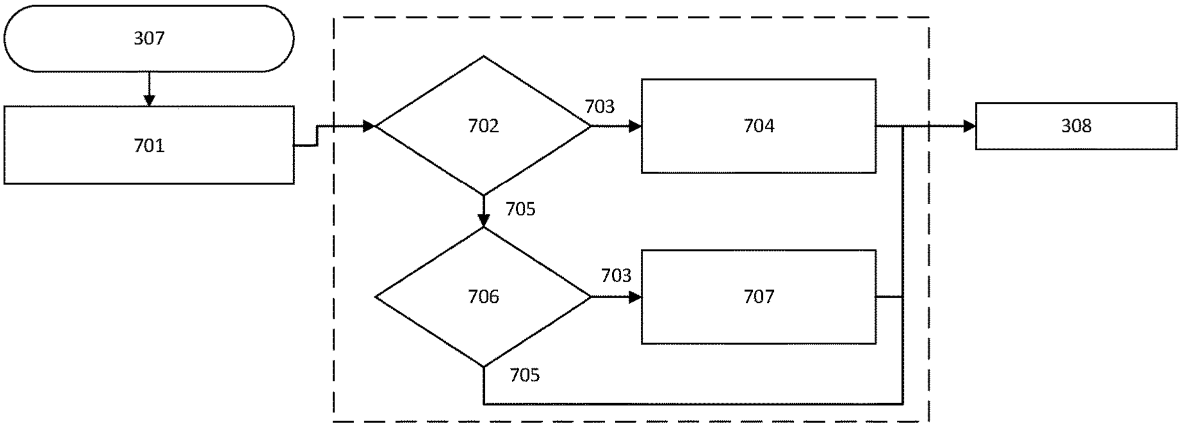

FIG. 7: a flowchart illustrating the flow chart of adaptive power allocation 220 at 110.

307: Step 307 in FIG. 3

308: Step 308 in FIG. 3

701: step that defines the power gap $P_G$, the average power of the received signal $P_{RS}=P_{TS}\times CSI$ at 120.

702: check if $T_H-P_G<P_{RS}<T_H$?

703: True

704: decrease $P_{RS}$ by $\sqrt{1-P_G}$

705: False

706: check if $T_H<P_{RS}<T_H+P_G$?

707: increase $P_{RS}$ by $\sqrt{1+P_G}$

Figure 8:
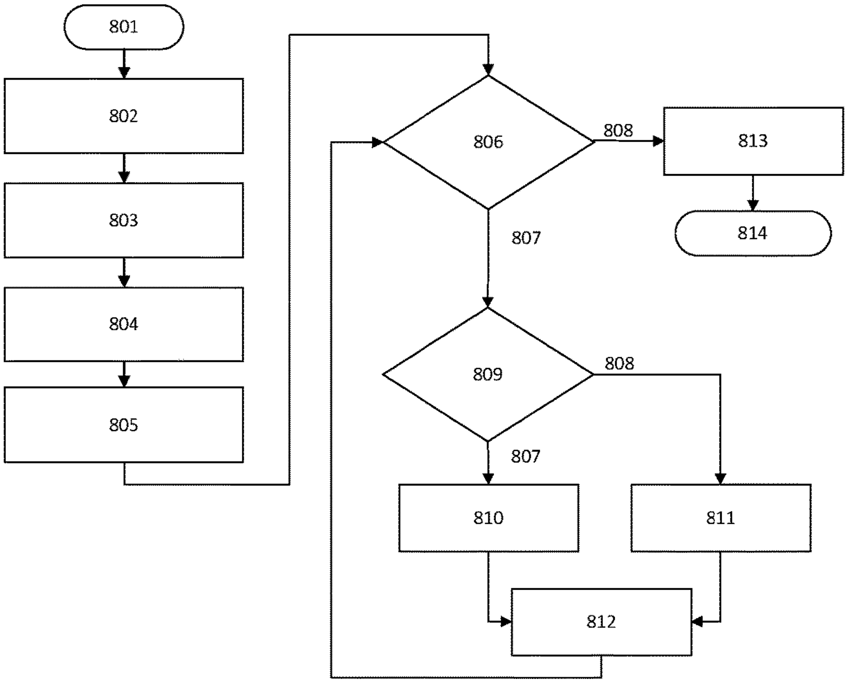

FIG. 8: A flow chart illustrating the of pilot location identification mechanism at 120 from the received signal.

801: start flow chart

802: intializes parameters $N_{TS}$, $S_R$, $N_{SG}$, $N_{TP}$, $L_{PG}$, where $N_{TS}$ represents the total subcarriers in the signal transmitted by 110, $S_R$ represents the total number of subgroups of the subcarriers in the received signal at 120, $N_{SG}$ denotes the total subcarriers in a subgroup, $N_{TP}$ denotes the possible locations for pilot subcarriers in a subgroup, and $L_{PG}$ denotes the location of pilot subcarrier within $N_{TP}$.

803: find the threshold $T_H$ from the average power of the received signal at 120.

804: divide $N_{Ts}$ into $S_R$.

805: calculate the average power of each subgroup $P_{SG}$

806: check if $j<=S_R$?

807: True

808: False

809: compare $P_{SG}$ with $T_H$, if $P_{SG}(j)<T_H$?

810: allocate the subcarrier on the position α in subgroup to pilot symbol (i.e., $L_{PG}(j)=\alpha$)

811: allocate the subcarrier on the position b in subgroup to pilot symbol (i.e., $L_{PG}$ $(j)=b$)

812: j=j+1, increment in j by 1 (i.e., count the subgroup for which the pilot location has been detected)

813: Detect the pilot and data symbols from the pilot and data subcarriers, respectively

814: end flow chart

DETAILED DESCRIPTION OF THE INVENTION

As mentioned above, present invention relates to a method for integrated sensing and communication against potential security threats wherein said method comprises the steps of;

Allocation of the adaptive pilot based on the channel state information (CSI) of the user whose communication is to be secured (210), Allocation of the adaptive power to increase the gap between the signal power at the transmitter and the receiver of the aforementioned user (220), and Identification of the pilot location from the received signal at the user (230).

In step 210, a legitimate receiver (120) transmits the pilots' subcarriers to a legitimate transmitter (110) for the estimation of channel state information (CSI).

In step 220, legitimate transmitter (110) allocates pilot and data subcarriers in the transmission signal according to the adaptive pilot allocation mechanism 210 and performs the adaptive power allocation.

In step 230, The signal is transmitted to a legitimate receiver (120) on the wireless channel 150A. At the legitimate receiver (120), firstly the average power of the received signal is measured and then pilots are obtained using the pilot location identification mechanism 230 to perform the channel estimation.

In an aspect, step 210 wherein adaptive pilot allocation is applied at legitimate transmitter (110) for securing pilot location comprises;

initialization of parameters including $N_{PC}$, $N_{SC}$, $N_{TS}$, $N_{SG}$, $N_{TP}$, $L_{PG}$, $N_{PC}$ channel bandwidth (302)

defining the threshold value $T_H$ based on the average power of the channel (303), dividing $N_{PC}$ into $N_{SC}$ subchannels (304), interleaving of the subchannels to reduce the correlation between the neighboring subchannels so an eavesdropper (130) will not estimate the channel through correlation (305), Dividing $N_{TS}$ into subgroups each having $N_{SG}$ subcarriers and multiplying with the power of the corresponding subchannel (306), calculating average power of each subgroup (307), if $i<=S_T$ is false (310), e.g. pilot locations are decided in all subgroups, place pilot and data symbols on the pilot and data subcarriers, respectively (315), if $i<=S_T$ is true (309), e.g. pilots locations are not decided in all subgroups, compare $P_{SG}$ with $T_H$ (311), if $P_{SG}$ (i)<$T_H$? is true (309), e.g. $P_{SG}$ of ith subgroup is less than $T_H$, allocate the subcarrier on the position α in subgroup to pilot symbol, e.g., $L_{PG}$ (i)=α(312)

if $P_{SG}$ (i)<$T_H$? is false (310), $P_{SG}$ of ith subgroup is greater than $T_H$, allocate the subcarrier on the position b in subgroup to pilot symbol (i.e., $L_{PG}$ (i)=b) (313);

i=i+1, increment in i by 1 (i.e., count the subgroup for which the pilot location has been decided) (314)

place pilot and data symbols on the pilot and data subcarriers, respectively (315)

Herein $N_{PC}$ represents channel bandwidth, $N_{SC}$ represents the total number of subchannels, $N_{TS}$ represents the total subcarriers in the transmit signal at 110, $S_T$ represents the total number of a subgroups, $N_{SC}$ denotes the total subcarriers in a subgroup, $N_{TP}$ denotes the possible positions for the pilot subcarriers in a subgroup, and $L_{PG}$ denotes the location of pilot subcarrier within $N_{TP}$ In an aspect, step 220 wherein, adaptive power allocation is applied at legitimate transmitter (110) comprises;

defining the power gap PG, and the average power of the received signal $P_{RS}=P_{TS}\times CSI$ at (120), the legitimate receiver (701), Comparing if $T_H-P_G<P_{RS}<T_H$ If true (703), decrease $P_{RS}$ by $\sqrt{1-P_G}$ (704) and complete adaptive pilot allocation mechanism (210) steps from (308) to (315), If false (705), check if $T_H<P_{RS}<T_H+P_G$(706) if true (703) then increase the $P_{Rs}$ by $\sqrt{1+P_G}$ (707) and complete adaptive pilot allocation mechanism (210) steps from (308) to (315), if $T_H<P_{RS}<T_H+P_G$(706) do not change $P_{Rs}$ then complete adaptive pilot allocation mechanism (210) steps from (308) to (315).

The step 220 adaptive power allocation is applied at legitimate receiver (110) starts after calculating average power of each subgroup $P_{SG}$(307).

In an aspect, step 230 wherein identification of the pilot location from the received signal at the user is carried out comprises;

Initializing parameters $N_{TS}$, $S_R$, $N_{SG}$, $N_{TP}$, $L_{PG}$ (802)

Determination of the threshold $T_H$ by the legitimate transceiver (120) from the average power of the received signal (803)

dividing the received signal's subcarriers $N_{Ts}$ into $S_R$ (804),

Calculating the average power of a subgroup $P_{SG}$ (805),

Checking if $j<=S_T$ (806), if false (808) move to step (813) where j denotes the jth subgroup if $j<=S_T$ (806) is true (807) then compare $P_{SG}$ with $T_H$, if $P_{SG}$ (j)<$T_H$ if true (807), e.g. $P_{SG}$ of jth subgroup is less than $T_H$, then allocate the subcarrier on the position α in subgroup to pilot symbol (i.e., $L_{PG}$(j)=α) (810), if at comparison of $P_{SG}$ with $T_H$, $P_{SG}$ (j)<$T_H$ is false (808), e.g. $P_{SG}$ of jth subgroup is greater than $T_H$, allocate the subcarrier on the position b in subgroup to pilot symbol (i.e., $L_{PG}$ (j)=b) (811), j=j+1, increment in j by 1 (i.e., count the subgroup for which the pilot location has been detected) (812)

Detect pilot and data symbols from the pilot and data subcarriers, respectively (813).

Herein, $N_{Ts}$ represents the total subcarriers in the signal transmitted by 110, $S_R$ represents the total number of a subgroup of the subcarriers in the received signal at 120, $N_{SG}$ denotes the total subcarriers in a subgroup, $N_{TP}$ denotes the possible locations for pilot subcarriers in a subgroup, and $L_{PG}$ denotes the location of the pilot subcarrier within $N_{TP}$

INDUSTRIAL APPLICABILITY OF THE INVENTION

With new wireless standards of 3GPP and IEEE organizations such as 5G and IEEE 802.11be, the sensing requirement becomes very critical, especially for newly emerged applications such as autonomous vehicles, virtual reality, mission-critical autonomous robots, etc.

The invention is a method to protect wireless communication and sensing signals from being overheard/intercepted by malicious eavesdroppers. As such, it is applicable to industry which is interested in security of the communication.

With the sensing requirement, the physical layer security of integrated sensing and communication for new applications can be met by the invention. The invention provides secure transmission by adjusting pilot subcarriers' location based on the channel state information of the receiver.

Around these basic concepts, it is possible to develop several embodiments regarding the subject matter of the invention; therefore, the invention cannot be limited to the examples disclosed herein, and the invention is essentially as defined in the claims.

It is obvious that a person skilled in the art can convey the novelty of the invention using similar embodiments and/or that such embodiments can be applied to other fields similar to those used in the related art. Therefore, it is also obvious that these kinds of embodiments are void of the novelty criteria and the criteria of exceeding the known state of the art.

DETAILED EXPLANATION OF THE FIGURES

Figure 1:
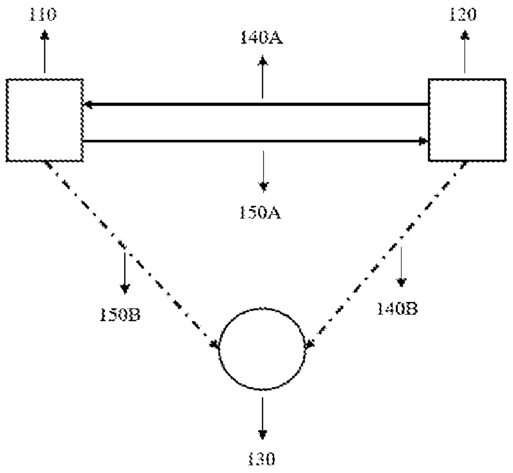
FIG. 1: A block diagram illustrating the wireless communication system according to an embodiment of the present invention

FIG. 1 is a block diagram illustrating the wireless communication system according to the embodiment of the present invention, which includes three nodes 110, 120, and 130. 110 may be a legitimate transmitter and/or a legitimate receiver that may receive pilot subcarriers from the legitimate receiver 120 through the wireless channel 140A, and may transmit the data and/or pilot subcarriers through the wireless channel 150A. 130 is an eavesdropper that may want to detect the sensing information and/or may want to listen to the communication between 110 and 120 through wireless links 140B and/or 150B. The wireless channels 140A and 150A follow the reciprocity property, which means they may have similar channel gains. Besides, the wireless channels 140B and 150B are different from 140A and 150A, respectively.

FIG. 2 shows the flow diagram of the basic operations for secure integrated sensing and communication in accordance with certain aspects of the present disclosure. Firstly, 120 transmits the pilots' subcarriers to 110 for the estimation of channel state information (CSI). After obtaining CSI, 110 allocates pilot and data subcarriers in the transmission signal according to the adaptive pilot allocation mechanism 210 and performs the adaptive power allocation 220. The signal is transmitted to 120 on the wireless channel 150A. At 120, firstly the average power of the received signal is measured and then pilots are obtained using the pilot location identification mechanism 230 to perform the channel estimation.

FIG. 3 is a flow chart illustrating the adaptive pilot allocation mechanism that is applied at 110 for securing pilot location.

Step 301 presents the start of the adaptive pilot allocation mechanism flow chart to secure the pilot locations 110.

Step 302 presents the initialization of parameters including $N_{PC}$, $S_T$, $N_{SC}$, $N_{TS}$, $N_{SG}$, $N_{TP}$, $L_{PG}$. $N_{PC}$ channel bandwidth, $N_{SC}$ represents the total number of subchannels, $N_{TS}$ represents the total subcarriers in the transmit signal at 110, $S_T$ represents the total number of a subgroups, $N_{SG}$ denotes the total subcarriers in a subgroup, $N_{TP}$ denotes the possible positions for the pilot subcarriers in a subgroup, and $L_{PG}$ denotes the location of pilot subcarrier within $N_{TP}$.

Step 303, Define the threshold value $T_H$ based on the average power of the channel Step 304, $N_{PC}$ is divided into $N_{SC}$ subchannels.

Step 305 presents the interleaving of the subchannels to reduce the correlation between the neighboring subchannels so 130 may not estimate the channel through correlation.

Step 306, Divide $N_{TS}$ into subgroups each having $N_{SC}$ subcarriers and multiplying with the power of the corresponding subchannel.

Step 307, calculates average power of each subgroup $P_{SG}$.

Step 308 check if $i<=S_T$? If the statement is true 309 (i.e., pilots locations are not decided in all subgroups), go to step 311. Otherwise, if the statement is false 310 (i.e., pilot locations are decided in all subgroups), move to step 315, where i denotes the ith subgroup of subcarriers in the transmit signal of 110.

309: True

310: False

Step 311, compare $P_{SG}$ with $T_H$, if $P_{SG}(i)<T_H$? is true 309 (i.e., $P_{SG}$ of ith subgroup is less than $T_H$), allocate the subcarrier on the position α in subgroup to pilot symbol (i.e., $L_{PG}(i)=\alpha$) at step 312. Otherwise, if $P_{SG}(i)<T_H$? is false 310 (i.e., $P_{SG}$ of ith subgroup is greater than $T_H$), allocate the subcarrier on the position b in subgroup to pilot symbol (i.e., $L_{PG}(i)=b$) at step 313.

312: allocate the subcarrier on the position α in subgroup to pilot symbol (i.e., $L_{PG}(i)=a$)

313: allocate the subcarrier on the position b in subgroup to pilot symbol (i.e., $L_{PG}(i)=b$)

Step 314, i=i+1, increment in i by 1 (i.e., count the subgroup for which the pilot location has been decided)

Step 315, place pilot and data symbols on the pilot and data subcarriers, respectively.

Step 316, End the flow chart.

FIG. 4 is a plot illustrating the power of the time domain signal generated at 110. The $T_H$ represents the threshold values calculated by taking the average power of the signal.

FIG. 5 is a pictorial representation of the adaptive power algorithm at 110.

530 presents channel frequency response 513 with $N_{PC}$ channel bandwidth in power 511 and frequency 512. The channel is divided into subchannels 514, where the subcarriers in each subchannel have a flat frequency response.

540 presents the channel interleaving phenomenon to reduce the correlation between neighboring subchannels. Firstly, the subchannels are divided into groups of four for example and then the subchannels of each group are interleaved starting from the first subchannel in a sequence.

550 presents transmit signal in frequency. There signal consists of $N_{TS}$ 516 subcarriers divided into subgroups with each having $N_{SG}$ 517 subcarriers.

560 presents the pilot and data subcarriers in each subgroup after multiplication with the channel, the average power of the subcarriers in a subgroup 518 and the threshold value $T_H$ 519. Out of $N_{SG}$ subcarriers, there are $N_{TP}$ possible pilot positions 520 and the pilot symbol is placed on the subcarrier 521.

570 presents $N_{TS}$ with pilot subcarriers carrying pilot symbols 521 and data subcarriers carrying data symbols 522 in each subgroup.

Figure 6:
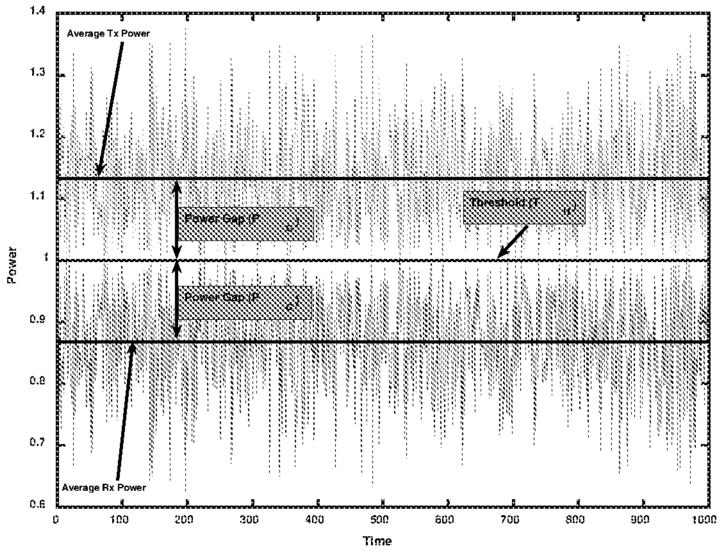

FIG. 6 is a plot illustrating the transmit and receive signal with the adaptive power allocation mechanism, which is disclosed in the invention to maintain a power gap PG between $T_H$ and the power of the transmit signal at 110 and power of the receive signal at 120. This power gap PG is necessary for successful pilot location identification at 120. When the gap between $T_H$ and powers of transmit signal by 110 and received signal by 120 is less than the defined power gap $P_G$, the pilot location identification results in an error. Thus, leading to the wrong estimation of the channel at 120.

FIG. 7 is a flowchart illustrating the algorithm of adaptive power allocation 220 at 110. This method starts after step 307 of adaptive pilot allocation mechanism 210.

Step 701 defines the power gap PG, and the average power of the received signal $P_{RS}=P_{TS}\times CSI$ at 120.

Step 702 compares if $T_H-P_G<P_{RS}<T_H$? if the statement is true 703, then decrease $P_{RS}$ by $\sqrt{1-P_G}$ 704 and complete adaptive pilot allocation mechanism 210 from Step 308 to end. Otherwise, if the statement is false 705, check if $T_H<P_{RS}<T_H+P_G$? 706 is true 703, then increase the $P_{RS}$ by $\sqrt{1+P_G}$ 707 and complete adaptive pilot allocation mechanism 210 from Step 308 to end. Otherwise, if $T_H<P_{RS}<T_H+$ $P_G$? do not change $P_{RS}$ the complete adaptive pilot allocation mechanism 210 from Step 308 to end.

FIG. 8 is a flow chart illustrating the of pilot location identification mechanism at 120 from the received signal.

Step 801 presents the start of the flow chart

Step 802 intializes parameters $N_{TS}$, $S_R$, $N_{SG}$, $N_{TP}$, $L_{PG}$, where $N_{TS}$ represents the total subcarriers in the signal transmitted by 110, $S_R$ represents the total number of a subgroup of the subcarriers in the received signal at 120, $N_{SG}$ denotes the total subcarriers in a subgroup, $N_{TP}$ denotes the possible locations for pilot subcarriers in a subgroup, and $L_{PG}$ denotes the location of the pilot subcarrier within $N_{TP}$.

Step 803, 120 finds the threshold $T_H$ from the average power of the received signal.

Step 804, divide the received signal's subcarriers $N_{TS}$ into $S_R$.

Step 805, calculate the average power of a subgroup $P_{SG}$.

Step 806, check if $j<=S_R$? If the statement is true 807 move to step 809. Otherwise if statement is false 808 move to step 814, where j denotes the jth subgroup.

Step 809, compare $P_{SG}$ with $T_H$, if $P_{SG}$ (j)<$T_H$? is true 807 (i.e., $P_{SG}$ of jth subgroup is less than $T_H$), allocate the subcarrier on the position α in subgroup to pilot symbol (i.e., $L_{PG}$ (j)=a) at step 810. Otherwise, if $P_{SG}$(j)<$T_H$? is false 808 (i.e., $P_{SG}$ of jth subgroup is greater than $T_H$), allocate the subcarrier on the position b in subgroup to pilot symbol (i.e., $L_{PG}$ (j)=b) at Step 811.

Step 812, j=j+1, increment in j by 1 (i.e., count the subgroup for which the pilot location has been detected)

Step 813, Detect pilot and data symbols from the pilot and data subcarriers, respectively Step 814, End.

The invention claimed is:

1. A method for protecting integrated sensing and communication against security threats, the method comprising:

allocating an adaptive pilot based on channel state information of a user having a communication to be secure, the adaptive pilot being a waveform component which is a symbol placed on a subcarrier, the channel state information being an input variable to an algorithm, the algorithm deciding a structure of a signal of the communication;

allocating the adaptive pilot adapted to reduce pilot location identification error by increasing a gap between a signal power at a transmitter and at a receiver of the user so as to prevent an eavesdropper from estimating a channel through correlation; and identifying a pilot location from an average power of a received signal at the user.

2. The method of claim 1, wherein a legitimate receiver transmits the subcarrier to a legitimate transmitter so as to estimate the channel state information.

3. The method of claim 1, wherein a legitimate transmitter allocates the subcarrier in a signal of the transmitter so as to perform the allocation of the adaptive power.

4. The method of claim 3, wherein the signal is transmitted to the legitimate receiver on a wireless channel, wherein an average power of a signal at the legitimate receiver and then a pilot is obtained using pilot location identification to perform a channel estimation of the channel.

* * * * *